United States Patent [19]

Becker

[11] 4,446,028

[45] May 1, 1984

[54] ISOPROPENYL PHOSPHONIC ACID COPOLYMERS USED TO INHIBIT SCALE FORMATION

[75] Inventor: Larry W. Becker, Wilmington, Del.

[73] Assignee: Betz Laboratories, Inc., Trevose, Pa.

[21] Appl. No.: 451,644

[22] Filed: Dec. 20, 1982

[51] Int. Cl.$^3$ ............................................. C02F 5/14
[52] U.S. Cl. ........................................ 210/697; 210/699; 210/700; 210/701; 252/180; 252/181; 252/389 A; 422/15
[58] Field of Search ............................. 210/696–701; 252/180, 181, 389.2; 422/15

[56] References Cited

U.S. PATENT DOCUMENTS

| | | | |
|---|---|---|---|
| 2,365,466 | 12/1944 | Hamilton | 260/543 P |
| 2,382,309 | 8/1945 | Hamilton | 260/551 |
| 2,439,214 | 4/1948 | Lindsey | 526/278 |
| 3,108,535 | 10/1963 | Uhlig | 101/149.2 |
| 3,179,518 | 4/1965 | Sus et al. | 430/155 |
| 3,202,534 | 8/1965 | Duch et al. | 427/388.1 |
| 3,220,832 | 11/1965 | Uhlig | 430/60 |
| 3,276,868 | 10/1966 | Uhlig | 430/60 |
| 3,297,663 | 1/1967 | Herbst et al. | 526/78 |
| 3,315,599 | 4/1967 | Lind | 101/149.2 |
| 3,396,020 | 8/1968 | Borchers | 430/161 |
| 3,434,838 | 3/1969 | Munder et al. | 430/159 |
| 3,468,725 | 9/1969 | Uhlig | 148/6.15 |
| 3,510,307 | 5/1970 | Borchers et al. | 430/163 |
| 3,519,607 | 7/1970 | Welch | 260/551 |
| 3,657,092 | 4/1972 | Fischer et al. | 204/181 |
| 3,684,779 | 8/1972 | Rapko | 210/699 |
| 3,992,318 | 11/1976 | Gaupp et al. | 252/181 |
| 4,159,946 | 7/1979 | Smith et al. | 210/699 |
| 4,170,563 | 10/1979 | Merrill et al. | 252/62.1 |
| 4,201,669 | 5/1980 | Becker et al. | 210/699 |
| 4,207,405 | 6/1980 | Masler et al. | 210/699 |
| 4,209,398 | 6/1980 | Ii et al. | 210/699 |
| 4,277,359 | 7/1981 | Lipinski | 252/180 |

FOREIGN PATENT DOCUMENTS

| | | |
|---|---|---|
| 1032537 | 6/1958 | Fed. Rep. of Germany . |
| 1106963 | 5/1961 | Fed. Rep. of Germany . |
| 1121632 | 1/1962 | Fed. Rep. of Germany . |
| 1130177 | 5/1962 | Fed. Rep. of Germany . |
| 1134093 | 8/1962 | Fed. Rep. of Germany . |
| 1135176 | 8/1962 | Fed. Rep. of Germany . |
| 1160733 | 1/1964 | Fed. Rep. of Germany . |
| 118296 | 12/1964 | Fed. Rep. of Germany . |
| 1183339 | 12/1964 | Fed. Rep. of Germany . |
| 1196467 | 7/1965 | Fed. Rep. of Germany . |
| 1237899 | 3/1967 | Fed. Rep. of Germany . |
| 1801411 | 5/1970 | Fed. Rep. of Germany . |
| 1182926 | 12/1971 | Fed. Rep. of Germany . |
| 2537160 | 3/1976 | Fed. Rep. of Germany . |
| 2455624 | 5/1976 | Fed. Rep. of Germany . |
| 1447953 | 12/1976 | Fed. Rep. of Germany . |
| 2615489 | 10/1977 | Fed. Rep. of Germany . |
| 2634784 | 2/1978 | Fed. Rep. of Germany . |
| 2745982 | 4/1979 | Fed. Rep. of Germany . |
| 2015964 | 8/1969 | France . |
| 53-20999 | 9/1968 | Japan . |
| 48-8700 | 3/1973 | Japan . |
| 48-32383 | 10/1973 | Japan . |
| 65-493 | 7/1965 | Netherlands . |
| 68-7938 | 6/1969 | South Africa . |
| 933107 | 8/1963 | United Kingdom . |
| 1019919 | 2/1966 | United Kingdom . |
| 1084070 | 9/1967 | United Kingdom . |
| 1129820 | 10/1968 | United Kingdom . |
| 1230447 | 5/1971 | United Kingdom . |
| 1290724 | 9/1972 | United Kingdom . |
| 176682 | 11/1965 | U.S.S.R. . |

OTHER PUBLICATIONS

Chem. Abstract, 78, 84998c, Levin et al.
Chem. Abstract, 83, 98046f, Levin et al.
Chem. Abstract, 92, 42454f, Morita.
Chem. Abstract, 92, 199660t, Reinhardt.
Chem. Abstract, 64, 6764b, and 11323e, Kolesnikov.
Chem. Abstract, 65, 17131d, Alovitdinov.
Chem. Abstract, 69, 10811d, Kolesnikov.
Chem. Abstract, 71, 30915k, Laskovin.
Chem. Abstract, 71, 70973j, Alovitdinov.
Chem. Abstract, 72, 32299g, Kolesnikov.
Chem. Abstract, 82, 13251y, Marhol.

*Primary Examiner*—Peter A. Hruskoci
*Attorney, Agent, or Firm*—Alexander D. Ricci; Bruce E. Peacock

[57] ABSTRACT

A water soluble isopropenylphosphonic acid copolymer composition and method of use thereof are disclosed. The copolymer comprises repeat units (a) of the formula

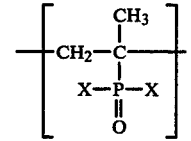

wherein X=OH or OM, wherein M is a cation; and repeat units (b) of the formula

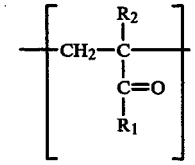

wherein $R_1$ is chosen from the group consisting of hydroxy, hydroxylated alkoxy, and amide and water soluble salts thereof; $R_2$ is H, or lower alkyl of from 1–3 carbon atoms. These copolymers are effective in inhibiting the precipitation of certain scale forming salts, and also act to inhibit corrosion in water systems.

12 Claims, No Drawings

ISOPROPENYL PHOSPHONIC ACID COPOLYMERS USED TO INHIBIT SCALE FORMATION

This is a division of application Ser. No. 267,221 filed on May 26, 1981, now abandoned.

FIELD OF THE INVENTION

The present invention pertains to a composition and method of utilization of same to inhibit corrosion and control the formation and deposition of scale imparting compounds in water systems such as cooling, boiler and gas scrubbing systems.

BACKGROUND OF THE INVENTION

The problems of corrosion and scale formation and attendant effects have troubled water systems for years. For instance, scale tends to accumulate on internal walls of various water systems, such as boiler and cooling systems, and thereby materially lessens the operational efficiency of the system.

Deposits in lines, heat exchange equipment, etc., may originate from several causes. For example, precipitation of calcium carbonate, calcium sulfate and calcium phosphate in the water system leads to an agglomeration of these scale imparting compounds along or around the metal surfaces which contact the flowing water circulating through the system. In this manner, heat transfer functions of the particular system are severely impeded.

Corrosion, on the other hand, is a degradative electrochemical reaction of a metal with its environment. Simply stated, it is the reversion of refined metals to their natural state. For example, iron ore is iron oxide. Iron oxide is refined into steel. When the steel corrodes, it forms iron oxide which, if unattended, may result in failure or destruction of the metal, causing the particular water system to be shut down until the necessary repairs can be made.

Typically, in cooling water systems, the formation of calcium sulfate, calcium phosphate and calcium carbonate, among others, has proven deleterious to the overall efficacy of the cooling water system. Recently, due to the popularity of cooling treatments using high levels of orthophosphate to promote passivation of the metal surfaces in contact with the system water, it has become critically important to control calcium phosphate crystallization so that relatively high levels of orthophosphate may be maintained in the system, to achieve the desired passivation, without resulting in fouling or impeded heat transfer functions which would normally be caused by calcium phosphate crystallization.

Although steam generating systems are somewhat different from cooling water systems, they share a common problem in regard to deposit formation.

As detailed in the Betz Handbook of Industrial Water Conditioning, 8th Edition, 1980, Betz Laboratories, Inc., Trevose, PA Pages 85–96, the formation of scale and sludge deposits on boiler heating surfaces is a serious problem encountered in steam generation. Although current industrial steam producing systems make use of sophisticated external treatments of the boiler feedwater, e.g., coagulation, filtration, softening of water prior to its feed into the boiler system, these operations are only moderately effective. In all cases, external treatment does not in itself provide adequate treatment since muds, sludge, silts and hardness-imparting ions escape the treatment, and eventually are introduced into the stream generating system.

In addition to the problems caused by mud, sludge or silts, the industry has also had to contend with boiler scale. Although external treatment is utilized specifically in an attempt to remove calcium and magnesium from the feedwater, scale formation due to residual hardness, i.e., calcium and magnesium salts, is always experienced. Accordingly, internal treatment, i.e., treatment of the water fed to the system, is necessary to prevent, reduce and/or retard formation of the scale imparting compounds and their deposition. The carbonates of magnesium and calcium are not the only problem compounds as regards scale, but also waters having high contents of phosphate, sulfate and silicate ions either occurring naturally or added for other purposes cause problems since calcium and magnesium, and any iron or copper present, react with each and deposit as boiler scale. As is obvious, the deposition of scale on the structural parts of a steam generating system causes poorer circulation and lower heat transfer capacity, resulting accordingly in an overall loss in efficiency.

DETAILED DESCRIPTION OF THE INVENTION

In accordance with the invention, it has surprisingly been discovered that a copolymer (I) having repeat unit moieties (a) and (b), as hereinbelow defined, is efficacious in controlling the formation of mineral deposits and inhibiting corrosion in various water systems. Repeat unit moiety (a) has the structure

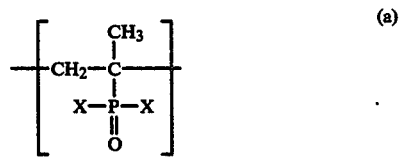

wherein X=OH, or OM wherein M is a cation.

Repeat unit (b) is characterized by the formula

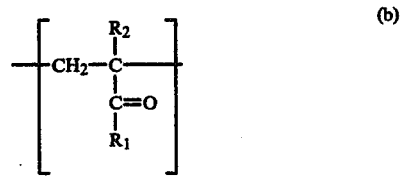

wherein $R_1$ is chosen from the group consisting of hydroxy, hydroxylated alkoxy, and amide, and water soluble salts thereof. Preferably, $R_1$ is hydroxylated lower alkoxy of from about 2–6 carbon atoms. $R_2$ in the above formula may equal alkyl of from 1–3 carbon atoms, or H, moieties. Based upon experimental data, the preferred repeat unit (b) is 2-hydroxypropylacrylate.

It is to be noted that terpolymers comprising two or more different members selected from the repeat unit (b) grouping and a member from the repeat unit (a) grouping are also within the purview of the invention.

In addition to the above two noted essential repeat units, (a) and (b), an optional third repeat unit (c) may be incorporated into the polymer backbone. Preferably, this third unit (c) is a maleic acid or maleic anhydride moiety.

The phosphonic acid monomer corresponding to repeat unit (a) above, which is to be co-polymerized with a monomer or monomers corresponding to repeat unit (b), may be prepared by a reaction mechanism involving the nucleophilic addition of PCl₃ to the carbonyl group of acetone. For instance, the reaction may proceed in accordance with the following equations:

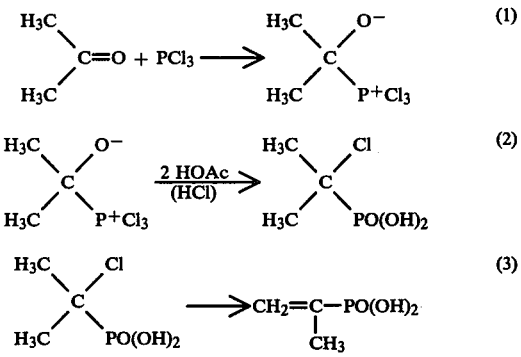

In this manner, the isopropenylphosphonic acid monomer (a) may be produced in a most cost effective manner due to the relativity low economic cost of the precursor acetone.

It is also possible to produce the desired monomer (a) via dehydration, by heating 2-hydroxy-2-propane phosphonic acid at a temperature of about 125°–250° C., as is detailed in U.S. Pat. No. 2,365,466.

As to monomer (b), hydroxylated alkyl acrylates are preferred, with the 2-hydroxypropylacrylate being most preferred. These moieties can be readily prepared via an addition reaction between acrylic acid or its derivatives or water soluble salts and the oxide of the alkyl derivative desired. For example, to prepare 2-hydroxypropylacrylate, acrylic acid may be reacted with propylene oxide.

With respect to other monomeric possibilities corresponding to repeat unit (b), they are well known in the art. For instance, acrylic acid may be prepared directly from ethylene cyanohydrin. Methacrylic acid may be prepared from acetone cyanohydrin, and acrylamide monomers may be prepared from acrylonitrile via treatment with $H_2SO_4$ or HCl.

If desired, it is possible to prepare a terpolymer utilizing a third monomer (c) such as maleic acid or its anhydride.

After the desired monomers are obtained, copolymerization may proceed under stop-reaction techniques in bulk, suspension, emulsion, solution, or thermal polymerization conditions. For instance, an aqueous solution system may be used with ammonium persulfate serving as the initiator. Other standard copolymerization systems utilizing initiators such as benzoyl peroxide, azobisisobutyronitrile or ferrous sulfate may also be employed. The molecular weights of the copolymers may be controlled utilizing standard chain control agents such as secondary alcohols (isopropanol), mercaptans, halocarbons, etc.

The resulting copolymers (I) most advantageously have a molar ratio of moieties (a:b) of from about 3:1 to about 0.5:1, and most preferably from about 1:1, to 2:1.

Based upon presently available experimental data the preferred copolymer (I) is isopropenylphosphonic acid/2-hydroxypropylacrylate (molar ratio a:b=1:1).

The fact that polymers were formed, in accordance with invention, was substantiated by $^{31}$PMR spectroscopy where broad absorptions between about −20 and −40 ppm (vs. o-$H_3PO_4$) are known to indicate significant polymer formation.

The copolymers (I) should be added to the aqueous system, for which corrosion inhibiting, and/or deposit control activity is desired, in an amount effective for the purpose. This amount will vary depending upon the particular system for which treatment is desired and will be influenced by factors such as, the area subject to corrosion, pH, temperature, water quantity and the respective concentrations in the water of the potential scale and deposit forming species. For the most part, the copolymers will be effective when used at levels of about 0.1–500 parts per million parts of water, and preferably from about 10 to 20 parts per million of water contained in the aqueous system to be treated. The copolymers may be added directly into the desired water system in a fixed quantity and in the state of an aqueous solution, either continuously or intermittently.

The copolymers of the present invention are not limited to use in any specific category of water system. For instance, in addition to boiler and cooling water systems, the polymers may also be effectively utilized in scrubber systems and the like wherein corrosion and/or the formation and deposition of scale forming salts is a problem. Other possible environments in which the inventive polymers may be used include heat distribution type sea water desalting apparatus and dust collection systems in iron and steel manufacturing industries.

The copolymers of the present invention can also be used with other components in order to enhance the corrosion inhibition and scale controlling properties thereof. For instance the copolymers may be used in combination with one or more kinds of compounds selected from the group consisting of inorganic phosphoric acids, phosphonic acid salts, organic phosphoric acid esters, and polyvalent metal salts.

Examples of such inorganic phosphoric acids include condensed phosphoric acids and water soluble salts thereof. The phosphoric acids include an orthophosphoric acid, a primary phosphoric acid and a secondary phosphoric acid. Inorganic condensed phosphoric acids include polyphosphoric acids such as pyrophosphoric acid, tripolyphosphoric acid and the like, metaphosphoric acids such as trimetaphosphoric acid, and tetrametaphosphoric acid.

As to the other phosphonic acid derivatives which are to be added in addition to the copolymers of the present invention, there may be mentioned aminopolyphosphonic acids such as aminotrimethylene phosphonic acid, ethylene diamine tetramethylene phosphonic acid and the like, methylene diphosphonic acid, hydroxy ethylidene-1,1-diphosphonic acid, 2-phosphonobutane-1,2,4-tricarboxylic acid, etc.

Exemplary organic phosphoric acid esters which may be combined with the polymers of the present invention include phosphoric acid esters of alkyl alcohols such as methyl phosphoric acid ester, ethyl phosphoric acid ester, etc., phosphoric acid esters of methyl cellosolve and ethyl cellosolve, and phosphoric acid esters of polyoxyalkylated polyhydroxy compounds obtained by adding ethylene oxide to polyhydroxy compounds such as glycerol, mannitol, sorbitol, etc. Other suitable organic phosphoric esters are the phosphoric acid esters of amino alcohols such as mono, di, and tri-ethanol amines.

Inorganic phosphoric acid, phosphonic acid, and organic phosphoric acid esters may be salts, preferably salts of alkali metal, ammonia, amine and so forth.

Exemplary polyvalent metal salts with may be combined with the polymers of formula (I) above include those capable of dissociating polyvalent metal cations in water such as $Zn^{++}$, $Ni^{++}$, etc, which include zinc chloride, zinc sulfate, nickel sulfate, nickel chloride and so forth.

When the copolymer (I) is added to the aqueous system in combination with an additional component selected from the group consisting of inorganic phosphoric acids, phosphonic acids, organic phosphoric acids esters, or their water-soluble salts (all being referred to hereinafter as phosphoric compounds), and polyvalent metal salts, a fixed quantity of said copolymer (I) may be added separately and in the state of aqueous solution into the system. The copolymers (I) may be added either continuously or intermittently. Alternatively, the copolymers (I) may be blended with the above noted phosphoric compounds or polyvalent metal salts and then added in the state of aqueous solution into the water system either continuously or intermittently. The phosphoric compounds or polyvalent metal salts are utilized in the usual manner for corrosion and scale preventing purposes. For instance, the phosphoric compounds or polyvalent metal salts may be added to a water system continuously or intermittently to maintain their necessary concentrations.

Generally, the phosphoric compounds should be present in the aqueous system in an amount of about 1–100 ppm (as $PO_4$) or the polyvalent metal salts should be present in an amount of about 1 to 50 ppm (as metal cation).

As is conventional in the art, the phosphoric compounds or polyvalent metal salts may be added, as pretreatment dosages, to the water system in an amount of about 20 to about 500 ppm, and thereafter a small quantity of chemicals may be added, as maintenance dosages.

The copolymers (I) may be used in combination with conventional corrosion inhibitors for iron, steel, copper, copper alloys or other metals, conventional scale and contamination inhibitors, metal ion sequestering agents, and other conventional water treating agents. Exemplary corrosion inhibitors comprise chromates, bichromates, tungstate, molybdates, nitrites, borates, silicates, oxycarboxylic acids, amino acids, catechols, aliphatic amino surface active agents, benzotriazole, and mercaptobenzothiazole. Other scale and contamination inhibitors include lignin derivatives, tannic acids, starch, polyacrylic soda, polyacrylic amide, etc. Metal ion sequestering agents include ethylene diamine, diethylene triamine and the like and polyamino carboxylic acids including nitrilo triacetic acid, ethylene diamine tetraacetic acid, and diethylene triamine pentaacetic acid.

EXAMPLES

The invention will now be further described with reference to a number of specific examples which are to be regarded solely as illustrative, and not as restricting the scope of the invention.

Preparation of Isopropenyl/Phosphonic Acid Monomer

To a 3 liter 3 neck flask equipped with a magnetic stirrer, thermometer, and pressure compensated addition funnel, was added 300 g (5.2 mole) of acetone. Phosphorus trichloride (730 g; 5.3 mole) was added rapidly through the addition funnel. The addition was only slightly exothermic. The mixture was stirred for 4½ hours. Acetic acid (1500 ml) was then added and a reflux condenser was added to the flask. The mixture became cloudy and refluxed as a copius quantity of hydrogen chloride was evolved. After the refluxing had subsided, hydrogen chloride gas was bubbled through the solution for ½ hour. The reaction mixture was then allowed to stir at room temperature overnight. The flask was equipped for distillation and volatiles were removed at atmospheric pressure until a head temperature of 118° C. was reached. A water aspirator was attached and the distillation continued until the pot temperature reached 175° C. The remainder of the volatiles were removed at $\approx 1$ mm and a pot temperature of 180°–190° C. The product was a viscous golden-yellow liquid and weighed 571 g (91%). After the mixture was cooled sufficient water was added to give a 50% aqueous solution. The $^{13}$CMR spectrum of aqueous product showed three doublets at 140.4, 132.7 ppm (J=172.1 Hz); 129.9, 129.5 ppm (J=9.8 Hz); 19.4, 18.9 ppm (J=13.4 Hz). The $^{31}$PMR spectrum showed a single peak at $\delta = -19.0$ ppm. There was a trace of an inorganic phosphorus impurity.

EXAMPLE 1

Preparation of Isopropenyl Phosphonic Acid/Hydroxypropylacrylate Copolymer (1:1 molar ratio)

To a 500 ml resin kettle equipped with a mechanical stirrer, thermometer, pressure compensated addition funnel, and reflux condenser, was added hydroxypropylacrylate (26.6 g; 0.2 mole). Isopropenyl phosphonic acid (25.4 g; 0.2 mole) was dissolved in 154.2 g water and added rapidly to the kettle. The reaction mixture was then sparged with nitrogen for ½ hour. Ammonium persulfate (6 g) was added and the nitrogen sparge continued for an additional ½ hour. The mixture was heated to reflux for 2 hours. An additional 6 g of ammonium persulfate was added. The mixture was then refluxed for an additional 2 hours. There was a definite increase in viscosity after the second addition of ammonium persulfate. The yellow product had a pH of 1.00 and was tested without further purification. A $^{31}$PMR spectrum showed broad polymer absorptions centered at $\delta = -32.9$ and $-34.7$ ppm and a small amount of monomer at $\delta = -19.0$ ppm. There was also a trace of inorganic phosphate.

EXAMPLE 2

Isopropenyl Phosphonic Acid/Hydroxypropylacrylate Copolymer (1:1 molar ratio)

The polymer was formed as in Example 1 except that the aqueous solution of isopropenylphosphonic acid was neutralized to pH 2.5 before addition to the reaction kettle. The amount of ammonium persulfate was reduced to 2×2.5 g. The yellowish brown solution had a pH of 2.55. The $^{31}$PMR spectrum showed polymer absorptions centered at $\delta = -33.1$, $-31.0$, $-27.5$ and $-24.7$ ppm. There was no evidence of phosphorus monomer.

EXAMPLE 3

Isopropenyl Phosphonic Acid/Hydroxypropylacrylate Copolymer (1:1 molar ratio)

The polymer was formed as described in Example 2 except that the pH of the isopropenylphosphonic acid solution was adjusted to 4.0 before polymerization. The yellow aqueous product had a final pH of 3.67. The $^{31}$PMR spectrum showed polymer absorptions centered at $-28.9$ and $-22.9$ ppm. There were also trace quantities of inorganic phosphates.

EXAMPLE 4

Isopropenyl Phosphonic Acid/Hydroxypropylacrylate Copolymer (3:1 molar ratio)

Using the same polymerization apparatus as described in Example 1, 17.1 g (0.13 mole) of hydroxypropylacrylate and 49.8 g (0.41 mole) of isopropenylphosphonic acid in 202.5 g water (neutralized to pH 2.5) was heated to reflux with 6 g of ammonium persulfate. After 2 hours of reflux an additional 6 g of initiator was added followed by 2 hours of reflux. The final pH of the brown solution was 2.7. The $^{31}$PMR spectrum of the product had polymer absorptions at $-30$ to $-33$ ppm and $-24$ ppm.

EXAMPLE 5

Isopropenyl Phosphonic Acid/Hydroxypropylacrylate Copolymer (2:1 molar ratio)

Using the apparatus and methodology as described in Example 1, isopropenyl phosphonic acid (61.6 g, 54%, 0.27 mole), hydroxypropylacrylate (16.6 g, 0.13 mole) and water (121.8 g) were charged in the reactor. Ammonium persulfate (6 g) was added. After 1½ hours of reflux, 6 g additional persulfate was added followed by an equivalent reflux period. The final pH of the yellow solution was 0.72.

EXAMPLE 6

Isopropenylphosphonic Acid/Hydroxypropylacrylate Copolymer (0.5:1 molar ratio)

Used the method of Example 5, isopropenyl phosphonic acid (30.7 g, 54%, 0.14 mole), hydroxypropylacrylate (36.4 g, 0.28 mole) and water (144.9 g) were charged in the reactor. The bulk of the polymer crystallized during the first period of reflux and was found to be insoluble in water.

EXAMPLE 7

Isopropenyl Phosphonic Acid/Acrylamide Copolymer (1:1 molar ratio)

Aqueous isopropenyl phosphonic acid (47 g; 54%, 0.2 mole) and aqueous acrylamide (28 g, 50%, 0.2 mole) were mixed in a resin kettle as previously described. Ammonium persulfate (6 g) and an additional 84 g of water were then added. The solution was sparged with nitrogen for ½ hour and heated to reflux. After 1½ hours, an additional 6 g of initiator was added followed by an additional 1½ hours of reflux. The aqueous product was yellow with a final pH of 1.3. The $^{31}$PMR showed polymeric absorptions at $\delta = -30.2$ to $-33.7$ ppm and $-25$ to $-29$ ppm.

EXAMPLE 8

Isopropenyl Phosphonic Acid/Hydroxyethylmethacrylate (3:1 molar ratio)

Aqueous isopropenyl phosphonic acid (71 g, 54%, 0.3 mole) and hydroxyethylmethacrylate (13 g, 0.1 mole) were mixed with 121.6 g water in a resin kettle. Ammonium persulfate (6 g) was added. After 1½ hours of reflux, an additional 6 g of initiator was added followed by another 1½ hours of reflux. The final product was a yellow solution with a pH of 0.68. The $^{31}$PMR showed polymeric absorptions centered at $\delta = -29.5$ and $-24.3$ ppm.

EXAMPLE 9

Isopropenyl Phosphonic Acid/Hydroxypropylacrylate/Maleic Anhydride Terpolymer 4:4:1 (molar ratio)

Aqueous isopropenyl phosphonic acid (47 g, 54%, 0.2 mole), hydroxypropylacrylate (26 g, 0.2 mole) and maleic anhydride (5 g, 0.05 mole, neutralized to pH 5 in 50 ml water) were mixed with 82.6 g water in a resin kettle under nitrogen. Ammonium persulfate (6 g) was added followed by 1½ hours of reflux. An equivalent amount of initiator was added and the reflux period repeated. The final product was yellow with a pH of 0.99. The $^{31}$PMR showed polymer absorptions centered at $\delta = -34$, $-32.3$ and $-28.8$ ppm.

EXAMPLE 10

Isopropenyl Phosphonic Acid/Hydroxypropylacrylate/Methyl Acrylate Terpolymer (15:5:3 molar ratio)

Aqueous isopropenyl phosphonic acid (71 g, 54%, 0.3 mole), hydroxypropylacrylate (13 g, 0.1 mole) and methyl acrylate (5 g, 0.06 mole) were mixed with 121.6 g water containing 6 g of ammonium pursulfate. After sparging with nitrogen for ½ hour, the mixture was heated to reflux for 1½ hours. An additional 6 g of initiator was added followed by an equivalent period of reflux. The final product had a pH of 0.65. The $^{31}$PMR showed significant polymeric absorptions at $-32.4$ and $-24.3$ ppm.

EXAMPLE 11

Isopropenyl Phosphonic Acid/Hydroxypropylacrylate/Acrylic Acid Terpolymer (3:3:1 molar ratio)

In a manner described in Example 8, aqueous isopropenyl phosphonic acid (47 g, 54%, 0.2 mole), hydroxypropylacrylate (26 g, 0.2 mole) and acrylic acid (5 g, 0.07 mole, neutralized to pH 5 in 50 ml water) were mixed with 82.6 g of water and polymerized. The final product had a pH of 1.08.

EXAMPLE 12

In order to evaluate the efficacy of isopropenylphosphonic acid/2-hydroxypropylacrylate copolymer (produced in accordance with Example 1) as a corrosion inhibitor and deposit control agent for cooling water systems, this copolymer was tested utilizing a procedure commonly referred to as the "Recirculator Test." According to this test, mild steel corrosion test coupons, and admiralty corrosion test coupons are cleaned, weighed and disposed on a rotating holder in a simulated cooling water bath which is contained within a 17 liter glass. The temperature of the system was maintained at about 120° F. and the rotational speed of the coupon holder was adjusted so as to give a water velocity of about 1.3 feet per second past the coupons. Certain of the coupons were pretreated with zinc polyphosphate whereas the remaining coupons were not so pretreated. The system has a constant makeup of new water and chemicals and blowdown. A heat transfer tube is also present in the system allowing a study of the effect of corrosion and scaling on a heat transfer surface. One end of the heat transfer tube is pretreated in similar fashion to coupon pretreatment.

Corrosion rate measurement was determined by weight loss measurement. At the end of one day, one mild steel coupon, one pretreated mild steel coupon, and one admiralty coupon were removed from the bath and a second weight measurement taken for each. At the termination of the test run, the remaining coupons were removed, cleaned and weighed.

Corrosion rates for the coupons were computed by differential weight loss according to the following equation:

$$\text{Corrosion Rate} = \frac{N^{th}\text{ Day Weight Loss} - 1^{st}\text{ Day Weight Loss}}{N - 1}$$

wherein N=6 or 7.

The simulated cooling water was manufactured to give the following conditions:
- 600 ppm $Ca^{+2}$ as $CaCO_3$
- 300 ppm $Mg^{+2}$ as $CaCO_3$
- 30 ppm total phosphates
- 18 ppm total inorganic phosphates
- 12 ppm orthophosphates
- pH=7.0

A system pretreatment step at a 25 ppm level (actives) of the copolymer was carried out over the first day of testing. After one day of this system pretreatment, the copolymer concentration was maintained at 10 ppm (actives) for the remainder of the test.

Results

Average corrosion rates for the mild steel and admiralty coupons, respectively, were a highly acceptable 1.5 mpy and 0.3 mpy. A blue black film of unknown composition formed on the mild steel coupons and on the non-pretreated end of the heat transfer tube.

At the 25 ppm level of copolymer, the system water was clear and an analytical test indicated no loss of orthophosphate in the water. The heat transfer surface was free of scale.

At a 10 ppm level of copolymer, the precipitation of orthophosphate was completely inhibited. This observation was supported by both physical and chemical analyses. The system water filtered easily through 0.2 um, and the chemical analyses for phosphate showed no loss of orthophosphate. At this copolymer treatment level, a black tightly adherent film formed on the heat transfer surface. It is not believed that this film would significantly reduce heat transfer.

EXAMPLE 14

Another method of evaluating deposit control activity of a material consists of measuring its ability to prevent bulk phase precipitation of a salt at conditions for which the salt would usually precipitate. It is additionally important to recognize that the material being evaluated is tested at "substoichiometric" concentrations. That is, typical molar ratios of precipitating cation to the material being evaluated are on the order of 20:1 and much greater. Consequently, stoichiometric sequestration is not the route through which bulk phase precipitation is prevented. The well known phenomenon is also called "threshold" treatment and is widely practiced in water treatment technology for the prevention of scale (salt) deposits from forming on various surfaces. In the results that follow calcium phosphate, commonly found in industrial water systems under various conditions, was selected as a precipitant. The copolymers of the present invention have been evaluated for their ability to prevent precipitation (i.e., inhibit crystallization) of this salt. The results are expressed as "percent inhibition", positive values indicate the stated percentage of the precipitate was prevented from being formed. Except as where noted to the contrary, the following conditions, solutions, and testing procedure were utilized to perform the calcium phosphate and inhibition tests, the results of which are reported herein in the following table:

| CALCIUM PHOSPHATE INHIBITION PROCEDURE | |
|---|---|
| Conditions | Solutions |
| T = 70° C. | 36.76 $CaCl_2.2H_2O$/liter $DIH_2O$ |
| pH 8.5 | 0.4482 g $Na_2HPO_4$/liter $DIH_2O$ |
| 17 hour equilibration | |
| $Ca^{+2}$ = 250 ppm as $CaCO_3$ | |
| $PO_4^{-3}$ = 6 ppm | |

Procedure (1) To about 1800 ml $DIH_2O$ in a 2 liter volumetric flask, add 20 ml of $CaCl_2.2H_2O$ solution followed by 2 drops of conc. HCl.
(2) Add 40 ml of $Na_2HPO_4$ solution.
(3) Bring volume to 2 liters with DI water.
(4) Place 100 ml aliquots of solution in 4 oz glass bottles.
(5) Add treatment.
(6) Adjust pH as desired.
(7) Place in 70° C. water bath and equilibrate for 17 hours.
(8) Remove samples and filter while hot through 0.2μ filters.
(9) Cool to room temperature and take Absorbance measurements using Leitz photometer (640 nm).
Preparation for Leitz
   a. 5 mls filtrate
   b. 10 mls Molybdate Reagent
   c. 1 dipper Stannous Reagent
   d. Swirl 1 minute, pour into Leitz cuvette wait 1 minute before reading.
(10) Using current calibration curve (Absorbance vs ppm $PO_4^{-3}$) find ppm $PO_4^{-3}$ of each sample.

Calculation

% Inhibition =

$$\frac{\text{ppm } PO_4^{-3} \text{ (treated)} - \text{ppm } PO_4^{-3} \text{ (control)}}{\text{ppm } PO_4^{-3} \text{ (stock)} - \text{ppm } PO_4^{-3} \text{ (control)}} \times 100$$

TABLE

| Copolymer | Molar Ratio Monomers | Native pH | % Actives* | Calcium Phosphate Inhibition | | |
|---|---|---|---|---|---|---|
| | | | | 5 ppm | 10 ppm | 20 ppm |
| From Example 1 | 1:1 IPPA/HPA | 1.00 | 26.1 | 21.9 | 89.3 | 100.0 |
| From Example 2 | 1:1 IPPA/HPA | 2.55 | 27.4 | 24.3 | 72.8 | 89.1 |
| From Example 3 | 1:1 IPPA/HPA | 3.67 | 28.6 | 27.8 | 44.7 | 78.3 |
| From Example 4 | 3:1 IPPA/HPA | 2.70 | 28.5 | 12.6 | 73.3 | 95.2 |
| From Example 5 | 2:1 IPPA/HPA | 0.72 | 27.8 | 16.7 | 42.6 | 69.4 |
| From Example 7 | 1:1 IPPA/Acrylamide | 1.29 | 34.3 | 14.4 | 36.9 | 91.5 |
| From Example 8 | 3:1 IPPA/hydroxy ethylmethacrylate | 0.68 | 20.4 | 23.0 | 28.3 | 47.9 |
| From Example 9 | 4:4:1 IPPA/HPA/maleic anhydride | 0.99 | 26.5 | 29.4 | 45.7 | 79.0 |
| From Example 10 | 15:5:3 IPPA/HPA/methyl acrylate | 0.68 | 26.0 | 18.0 | 43.3 | 76.6 |
| From Example 11 | 3:3:1 IPPA/HPA/acrylic acid | 1.08 | 23.9 | 5.2 | 55.0 | 93.7 |

*includes some initiator and unreacted monomer.
IPPA = isopropenylphosphonic acid
HPA = hydroxypropylacrylate While certain features of this invention have been described in detail with respect to various embodiments thereof, it will, of course, be apparent that other modifications can be made within the spirit and scope of this invention and it is not intended to limit the invention to the exact details shown above except insofar as they are defined in the appended claims.

I claim:

1. Method of controlling the deposition of scale imparting precipitates on the structural parts of a system exposed to an aqueous medium comprising scale imparting precipitates under deposit forming conditions, said method comprising adding to said aqueous medium an effective amount for the purpose of a water soluble copolymer (I) consisting essentially of repeat unit moieties (a) and (b), said repeat unit moiety (a) having the structure

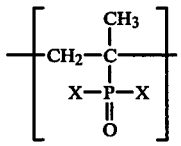

wherein X=OH' or OM, wherein M is a cation, said repeat unit moiety (b) having the structure

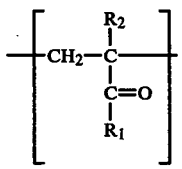

wherein $R_2$ is H, or lower alkyl of from about 1–3 carbon atoms, and wherein $R_1$ comprises a member selected from the group consisting of hydroxy, hydroxylated alkoxy, and amide, and water soluble salt forms thereof, said copolymer having a molar ratio of a:b of from about 3:1 to about 0.5:1.

2. Method as defined in claim 1 wherein said copolymer (I) is added to said aqueous medium in an amount of about 0.1–500 parts copolymer (I) per one million parts of said aqueous medium.

3. Method as defined in claim 2 wherein said system is steam generating system.

4. Method as defined in claim 2 wherein said system is a cooling water system.

5. Method as defined in claim 2 wherein said system is a gas scrubbing system.

6. Method as defined in claim 1 wherein $R_1$ in said repeat unit moiety (b) comprises hydroxylated alkoxy, and wherein $R_2$ in said repeat unit moiety (b) is H.

7. Method as defined in claim 6 wherein $R_1$ in said repeat unit moiety is 2-hydroxypropoxy.

8. Method as defined in claim 1 further comprising adding to said system, an effective amount for the purpose, of a compound (II) selected from the group consisting of inorganic phosphoric acids and water soluble salts thereof, phosphonic acids and water soluble salts thereof, organic phosphoric acid esters and water soluble salts thereof, and polyvalent metal salts capable of being dissociated to polyvalent metal ions in water.

9. Method as defined in claim 8 wherein said inorganic phosphoric acid (II) is a member selected from the group consisting of orthophosphoric acid, primary phosphoric acid, secondary phosphoric acid, pyrophosphoric acid, tripolyphosphoric acid, trimetaphosphoric acid, tetrametaphosphoric acid and water soluble salts thereof.

10. Method as defined in claim 8 wherein said phosphonic acid (II) is a member selected from the group consisting of ethylene diamine tetramethylene phosphonic acid, methylene diphosphonic acid, hydroxyethylidene-1,1-diphosphonic acid and 2-phosphonobutane 1,2,4-tricarboxylic acid.

11. Method as defined in claim 8 wherein said polyvalent metal salt is a member selected from the group consisting of zinc chloride, nickel chloride, zinc sulfate and nickel sulfate.

12. Method as defined in claim 8 wherein said compound (II) is added to said system in an amount of 20 to about 500 parts per million parts of said system.

* * * * *